United States Patent
Drevö et al.

(10) Patent No.: US 10,492,021 B2
(45) Date of Patent: Nov. 26, 2019

(54) METHODS, WIRELESS COMMUNICATION NETWORKS AND NETWORK NODES FOR RECOVERING A PUBLIC WARNING SYSTEM

(71) Applicant: TELEFONAKTIEBOLAGET L M ERICSSON (PUBL), Stockholm (SE)

(72) Inventors: Markus Drevö, Linköping (SE); Kenneth Balck, Linköping (SE); Martin Israelsson, Spånga (SE); Lars-Bertil Olsson, Angered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 14/892,498

(22) PCT Filed: May 6, 2014

(86) PCT No.: PCT/SE2014/050552
§ 371 (c)(1),
(2) Date: Nov. 19, 2015

(87) PCT Pub. No.: WO2014/189434
PCT Pub. Date: Nov. 27, 2014

(65) Prior Publication Data
US 2016/0127880 A1    May 5, 2016

Related U.S. Application Data

(60) Provisional application No. 61/825,235, filed on May 20, 2013.

(51) Int. Cl.
*H04W 40/24*    (2009.01)
*H04W 4/021*    (2018.01)
(Continued)

(52) U.S. Cl.
CPC ......... *H04W 4/021* (2013.01); *H04L 12/1895* (2013.01); *H04W 4/90* (2018.02); *H04L 12/189* (2013.01); *H04W 4/06* (2013.01)

(58) Field of Classification Search
CPC ....... H04W 4/22; H04W 4/021; H04W 40/24; H04W 8/186; H04W 36/00; H04W 24/02; H04W 48/12; H04H 20/59
See application file for complete search history.

(56) References Cited

U.S. PATENT DOCUMENTS 8,682,282 B2    3/2014  Ekemark et al.
2010/0210269 A1*  8/2010  Shuai ................ H04W 36/0022
                                                     455/436

(Continued)

FOREIGN PATENT DOCUMENTS

CN    102124765 A    7/2011
EP    2104381 A2    9/2009
(Continued)

OTHER PUBLICATIONS

International Search Report and Written Opinion dated Oct. 6, 2014, in International Application No. PCT/SE2014/050552, 13 pages.
(Continued)

*Primary Examiner* — Charles N Appiah
*Assistant Examiner* — Xiang Zhang
(74) *Attorney, Agent, or Firm* — Rothwell, Figg, Ernst & Manbeck, P.C.

(57) ABSTRACT

A method is described performed by a wireless communication network for recovering a public warning system when a radio network node comprising radio circuitry for communication with served user equipments, UEs, has been newly added or restarted in the network. The method comprises sending, by the radio network node to a core network node, information indicating that the radio network node has
(Continued)

been restarted or added to the network, the information including one or more tracking area identifiers, TAI, identifying one or more tracking areas that the radio network node supports and/or a radio network node identifier, ID, identifying the radio network node in the communication network, and, in case the radio network node ID is sent but not the one or more TAIs, acquiring, by the core network node the one or more TAIs based on the received radio network node ID.

15 Claims, 9 Drawing Sheets

(51) Int. Cl.
    *H04L 12/18*     (2006.01)
    *H04W 4/90*     (2018.01)
    *H04W 4/06*     (2009.01)

(56) References Cited

U.S. PATENT DOCUMENTS

| | | | |
|---|---|---|---|
| 2010/0299419 A1* | 11/2010 | Ramankutty | H04W 24/02 709/221 |
| 2011/0159837 A1 | 6/2011 | Daly et al. | |
| 2011/0300886 A1* | 12/2011 | Hapsari | H04H 20/57 455/500 |
| 2012/0100856 A1* | 4/2012 | Ishida | H04W 36/04 455/436 |
| 2014/0323077 A1* | 10/2014 | Chandramouli | G08B 27/006 455/404.1 |

FOREIGN PATENT DOCUMENTS

| | | | |
|---|---|---|---|
| EP | 2317784 | A1 | 5/2011 |
| WO | 2012145901 | A1 | 11/2012 |

OTHER PUBLICATIONS

3GPP, 3rd Generation Partnership Project; Technical Specification Group Core Network and Terminals; Technical realization of Cell Broadcast Service (CBS) (Release 12), 3GPP TS 23.041 V12.1.0, 2013, 64 pages.

3GPP, 3rd Generation Partnership Project; Technical Specification Group Core Network and Terminals; Technical realization of Cell Broadcast Service (CBS) (Release 11), 3GPP TS 23.041 V11.6.0, 2013, 63 pages.

3GPP, 3rd Generation Partnership Project; Technical Specification Group Core Network and Terminals; Numbering, addressing and identification (Release 11), 3GPP TS 23.003 V11.5.0, 2013, 83 pages.

3GPP, 3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11.3.0, 2013, 274 pages.

3GPP, 3rd Generation Partnership Project; Technical Specification Group Core Network and Terminals; Cell Broadcast Centre interfaces with the Evolved Packet Core Stage 3 (Release 11), 3GPP TS 29,168 V11.4.0, 2012, 35 pages.

3GPP, 3rd Generation Partnership Project; Technical Specification Group Services and System Aspects; Network architecture (Release 11), 3GPP TS 23.002 V11.5.0, 2012, 105 pages.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.5.0, 2013, 209 pages.

Chinese Office Action dated Feb. 5, 2018, issued in Chinese Patent Application No. 201480029098.1, 7 pages.

* cited by examiner

METHODS, WIRELESS COMMUNICATION NETWORKS AND NETWORK NODES FOR RECOVERING A PUBLIC WARNING SYSTEM

CROSS REFERENCE TO RELATED APPLICATION(S)

This application is a 35 U.S.C. § 371 National Phase Entry Application from PCT/SE2014/050552, filed May 6, 2014, designating the United States, and also claims the benefit of U.S. Provisional Application No. 61/825,235, filed May 20, 2013. The disclosures of both applications are incorporated herein in their entirety by reference.

TECHNICAL FIELD

The present disclosure relates generally to methods, wireless communication networks, core network nodes and radio network nodes for recovering a public warning system. More specifically, the present disclosure relates to methods, wireless communication systems, core network nodes and radio network nodes for recovering a public warning system when a radio network node has been newly added or restarted in the communication network.

BACKGROUND

The work of specifying the mobile communication technology Evolved Universal Terrestrial Radio Access Network, E-UTRAN, consisting of the Long Term Evolution, LTE, and System Architecture Evolution, SAE, concepts is currently ongoing within the $3^{rd}$ Generation Partnership Project, 3GPP. The result of these work items are the specifications on which the E-UTRAN and the Evolved Packet Core, EPC, are built. The E-UTRAN and the EPC together build a so called Evolved Packet System, EPS, network. The general architecture of the EPS network is shown in FIG. 1. The EPS comprises the E-UTRAN which comprises eNodeBs 110. X2 symbolizes logical communication interfaces between the eNodeBs 110. The EPS further comprises Mobile Management Entities, MMEs, and Service Gateways, S-GW 120 for handling data and control signaling exchanged in the EPS. S1 symbolizes logical communication interfaces between the eNodeBs 110 and the MME. The S-GW may be arranged in the same unit as the MME, then called a MME/S-GW 120.

A Public Warning System, PWS, is a system that provides a service that allows the communication network, e.g. EPS network, to distribute warning messages on behalf of a public authority, such as warnings of tsunamis, hurricanes or earthquakes. This ensures that the public has the capability to receive timely and accurate alerts, warnings and critical information regarding disasters and other emergencies. The E-UTRAN performs scheduling and broadcasting of the warning message content received from a Cell Broadcast Center, CBC, of the PWS system. The warning message content is forwarded to the E-UTRAN by the MME. The warning message itself is then broadcasted in dedicated system information blocks from the eNodeB to user equipments, UEs, of the users. The UE may be any wireless communication device, such as a mobile phone, a laptop, a palmtop, a computer etc.

A PWS architecture is shown in FIG. 2. The CBC 130 is part of the core network and connected to the MME 120 via a SBc reference point interface. Further, there is a node called Cell Broadcast Entity, CBE 140 connected to the CBC 130.

3GPP TS 23.041 version 12.1.0, section 9.1.3.4.2 shows a warning message delivery procedure according to the prior art. This procedure is also shown in FIG. 3, which is hereinafter referred to. The procedure is preceded by a registration procedure 1.0 in which a UE 100 (or actually many UEs) registers to the network. Thereafter, the CBE 140, which may be e.g. an information source such as public safety answering point, PSAP, sends emergency information in an emergency broadcast request 1.1 such as "warning type", "warning message", "impacted area", "time period" to the CBC 130. Using the "impacted area" information, the CBC identifies which MMEs need to be contacted and determines the information to be placed into a Warning Area Information Element. The CBC sends a Write-Replace Warning Request message 1.2 containing the warning message to be broadcast and delivery attributes, e.g. Message identifier, Serial Number, Tracking Area ID, TAI, list, Warning Area, etc. The MME uses the TAI list for selecting which eNodeBs to forward the Write-Replace Warning Request message to. The Warning Area may be a list of Cell IDs and/or a list of TAIs and/or one or more Emergency Area IDs. The eNodeB is configured with the TAI(s) and Cell ID(s) it serves and the Emergency Area ID(s) that it belongs to. The eNodeB checks for any match of the contents of the Warning Area with these IDs to identify the cells where to distribute the warning message.

Thereafter, the MME 120 sends a Write-Replace Warning Confirm message 1.3 that indicates to the CBC 130 that the MME has started to distribute the warning message to eNodeBs 110. Upon reception of the Write-Replace Confirm messages 1.3 from the MMEs, the CBC may confirm 1.4 to the CBE 140 that it has started to distribute the warning message. The MME 120 then forwards 1.5 the Write-Replace Warning Request message to the eNodeBs 110. The MME uses the Tracking Area ID list to determine the eNodeBs in the delivery area. If the Tracking Area ID list is empty the message is forwarded to all eNodeBs that are connected to the MME. The eNodeB is to use the Warning Area information to determine the cell(s) in which the message is to be broadcast. The eNodeB returns a Write-Replace Warning Response message 1.7 to the MME.

The eNodeB broadcasts 1.6 the message according to the attributes set by the CBC that originated the warning message distribution. When the UE receives the warning message it can use different warning type values such as: 'earthquake', 'tsunami' or 'earthquake and tsunami', immediately to alert the user 1.8. From the Write-Replace Warning Response messages returned by eNodeBs, the MME determines the success or failure of the delivery and creates a trace record 1.10.

A problem with the procedure described above is that an eNodeB that is restarted will lose the information of ongoing warning broadcasts and will not transmit the information. Such a restarted eNodeB will also miss information of ongoing warning broadcasts sent from the CBC during the time it is being restarted. Hence, users connected to, or camping on, cells belonging to this eNodeB will not receive the information and the CBC is not aware of that the eNodeB has lost this information. Also, an eNodeB newly added to the network in an area with ongoing warning broadcasts do not have the right information to broadcast. Also in this case the CBC does not know that a new eNodeB that should perform broadcast has been added. In other words, there is a risk that users in an area which is soon to suffer from a natural catastrophe is not informed of the approaching danger even though the information is present, which may result in unnecessary human suffering.

SUMMARY

It is an object of the invention to address at least some of the problems and issues outlined above. It is another object to achieve a method and a communication network that can send information to a person, information originating from a PWS system, such as information of approaching danger e.g. a natural catastrophe, even though the UE of the person communicates with an eNode B that has newly been made operational in the communication network, i.e. newly restarted or newly added to the communication network. It is possible to achieve these objects and others by using a method and an apparatus as defined in the attached independent claims.

According to one aspect, a method is provided performed by a wireless communication network for recovering a public warning system when a radio network node comprising radio circuitry for communication with served UEs has been newly added or restarted in the network. The wireless communication network comprises the radio network node and a core network node connected to the radio network node. The method comprises sending by the radio network node to the core network node, information indicating that the radio network node has been restarted or added to the network, the information including one or more tracking area identifiers, TAI, identifying one or more tracking areas that the radio network node supports and/or a radio network node identifier, ID, identifying the radio network node in the communication network. The method further comprises, in case the radio network node ID is sent but not the one or more TAIs, acquiring, by the core network node the one or more TAIs based on the received radio network node ID and checking, by the core network node based on the information sent by the radio network node, whether there are any ongoing broadcasts in any of the one or more tracking areas that the radio network node supports. The method further comprises, when there are ongoing broadcasts in any of the one or more tracking areas that the radio network node supports, sending, by the core network node, a Write Replace Warning, WRW, request message to the radio network node, the WRW request message comprising information in the ongoing broadcasts, and broadcasting, by the radio network node to the served UEs, the information in the ongoing broadcasts, received in the WRW request message.

According to another aspect, a method is provided performed by a radio network node of a wireless communication network for recovering a public warning system when the radio network node has been newly added or restarted in the network. The wireless communication network further comprises a core network node connected to the radio network node. The method comprises sending, to the core network node, information indicating that the radio network node has been restarted or added to the network, the information including one or more TAIs identifying one or more tracking areas that the radio network node supports and/or a radio network node ID, identifying the radio network node in the communication network. The method further comprises, when there are ongoing broadcasts in any of the one or more tracking areas that the radio network node supports, receiving, from the core network node, a WRW request message comprising information in the ongoing broadcasts and broadcasting to UEs served by the radio network node the information in the ongoing broadcasts, received in the WRW request message.

According to another aspect, a method is provided performed by a core network node of a wireless communication network for recovering a public warning system when a radio network node of the wireless communication network has been newly added or restarted in the network. The radio network node is connected to the core network node. The method comprises receiving, from the radio network node, information indicating that the radio network node has been restarted or added to the network, the information including one or more TAIs identifying one or more tracking areas that the radio network node supports and/or a radio network node ID identifying the radio network node in the communication network, and, in case the radio network node ID is received but not the one or more TAIs, acquiring the one or more TAIs based on the received radio network node ID. The method further comprises checking, based on the received information, whether there are any ongoing broadcasts in the one or more tracking areas that the radio network node supports, and, when there are ongoing broadcasts in any of the one or more tracking areas that the radio network node supports, sending a WRW request message to the radio network node, the WRW request message comprising information in the ongoing broadcasts.

According to another aspect, a radio network node is provided, operable in a wireless communication network for recovering a public warning system when the radio network node has been newly added or restarted in the network. The wireless communication network further comprises a core network node connected to the radio network node. The radio network node comprises a processor and a memory. The memory contains instructions executable by said processor, whereby said radio network node is operative for sending, to the core network node, information indicating that the radio network node has been restarted or added to the network, the information including one or more TAIs identifying one or more tracking areas that the radio network node supports and/or a radio network node ID identifying the radio network node in the communication network and, when there are ongoing broadcasts in any of the one or more tracking areas that the radio network node supports, receiving, from the core network node, a Write Replace Warning, WRW, request message comprising information in the ongoing broadcasts, and broadcasting to UEs served by the radio network node the information in the ongoing broadcasts, received in the WRW request message.

According to another aspect, a core network node is provided operable in a wireless communication network for recovering a public warning system when a radio network node of the wireless communication network has been newly added or restarted in the network. The radio network node is connected to the core network node. The core network node comprises a processor and a memory. The memory contains instructions executable by said processor, whereby said core network node is operative for receiving, from the radio network node, information indicating that the radio network node has been restarted or added to the network, the information including one or more TAIs identifying one or more tracking areas that the radio network node supports, and/or a radio network node ID identifying the radio network node in the communication network, and, in case the radio network node ID is received but not the one or more TAIs, acquiring the one or more TAIs based on the received radio network node ID. The memory further contains instructions executable by said processor, whereby said core network node is operative for checking, based on the received information, whether there are any ongoing broadcasts in any of the one or more tracking areas that the radio network node supports, and, when there are ongoing broadcasts in any of the one or more tracking areas that the radio network node supports, sending a WRW request message to the radio network node, the WRW request message comprising information in the ongoing broadcasts.

According to other aspects, computer programs are also provided, the details of which will be described in the claims and the detailed description.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided that facilitates sending of information originating from a PWS system to a UE of a person situated in an area where the information is relevant, even though the UE of the person communicates with an eNode B that newly has become operational in the communication network. The information may be e.g. information of approaching danger in the area where the person is situated, such as a natural catastrophe. According to a first embodiment, information that an eNodeB 110 has become operational in a particular TAI in the network is provided to the CBC 130. The CBC checks if there are any ongoing broadcasts in this TAI and if there are, the CBC triggers a new Write Replace Warning request message to the MME serving this particular TAI. The MME forwards the new Write Replace Warning request message to all eNodeBs in the TAI including the eNodeB that just became operational. The eNodeB that just became operational then starts to broadcast the warning message in response to the received Write Replace Warning request message. According to a first embodiment, the eNodeBs which are already broadcasting the warning all send the Write-Replace Warning Response message including the cells (in a Broadcast Completed Area List) in which broadcasting is ongoing, but the ongoing broadcasting is not affected. Optionally, according to a second embodiment, the MME can also provide an identifier of the eNodeB to the CBC, allowing the MME to route the new Write Replace Warning request message to this particular eNodeB instead of to all eNodeBs in the TAI.

According to a third embodiment, the MME provides the eNodeB identifier only to the CBC, and if the CBC knows which TAI an eNodeB belongs, which could be by configuration, sufficient information is available to trigger the Write-Replace Warning request message. Thereby, the CBC becomes aware that an eNodeB may have lost the information needed to perform the PWS broadcast. With the invention the CBC receives information which may trigger the CBC to repeat the message to the TAIs where there are eNodeBs which may have lost the information.

An advantage of the second embodiment compared to the first embodiment is that the signaling in the network is reduced. The reason is that the MME knows which eNodeB to route to and can address this eNodeB compared to routing to all eNodeBs in the TAI. The third embodiment requires that the CBC is configured with information mapping the eNodeBs using the global eNB ID to one or several TAIs. In the second embodiment, where the CBC receives both the Global eNB ID and the list of TAIs, the CBC can trigger the message without the required configuration of the second embodiment.

Figure 1:
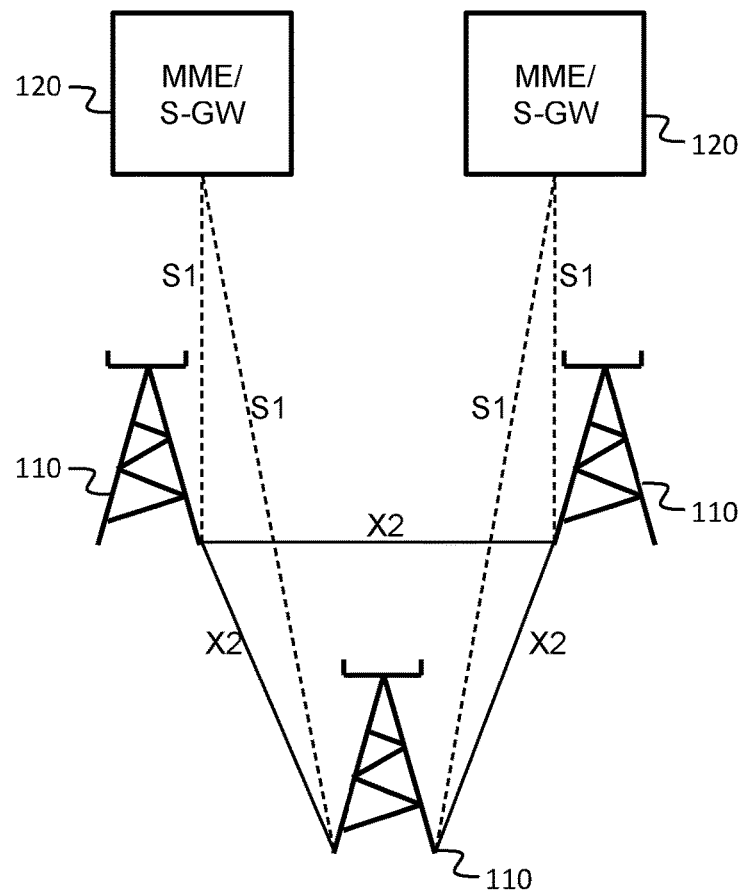
FIG. 1 is a block diagram of a communication system in which the present invention may be used.
Figure 2:
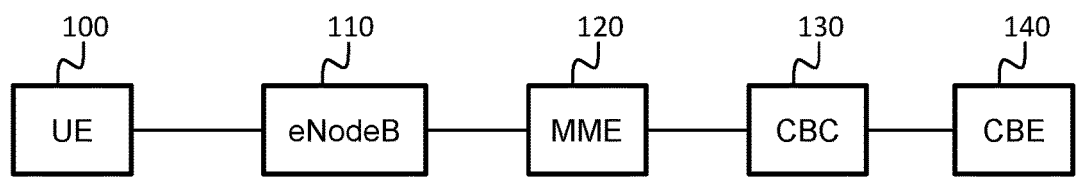
FIG. 2 is another block diagram of a communication system in which the present invention may be used.
Figure 3:
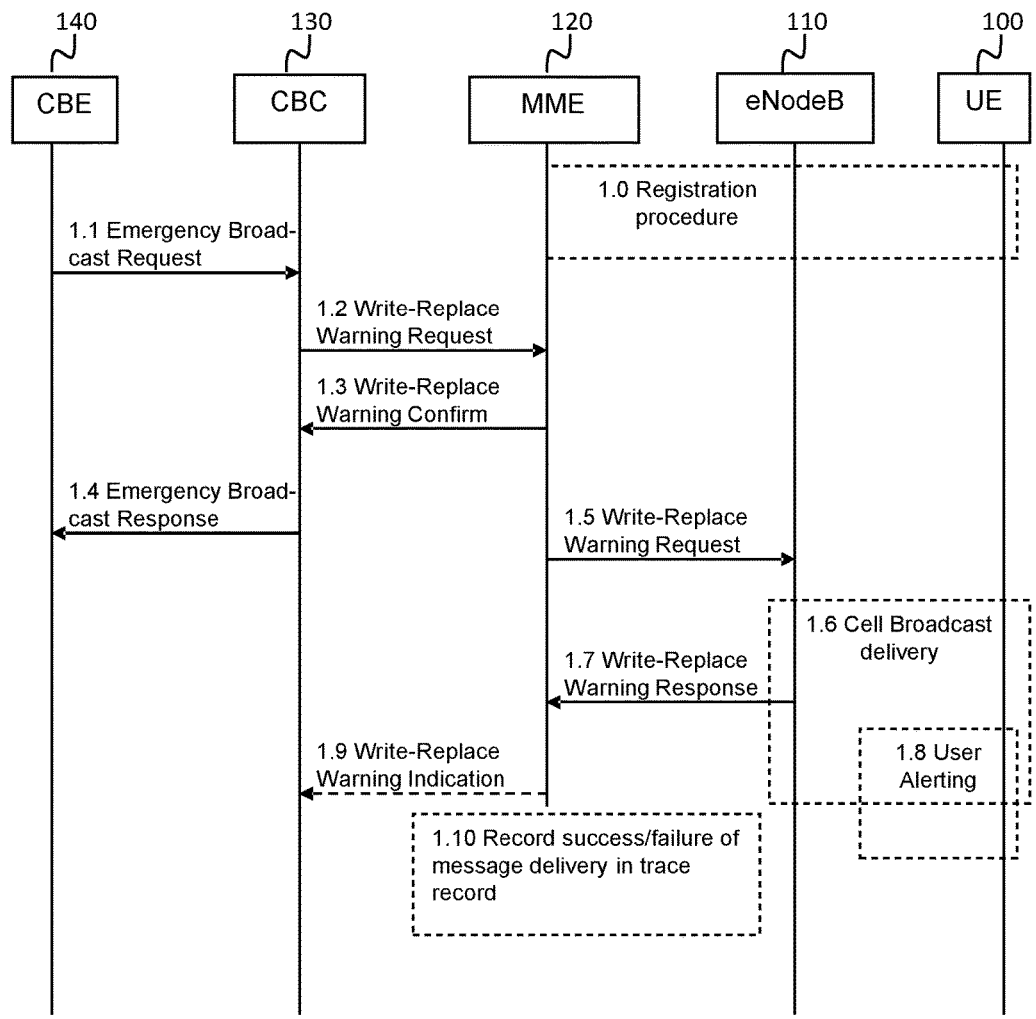
FIG. 3 is a signaling diagram illustrating an example of a procedure according to the prior art.
Figure 4:
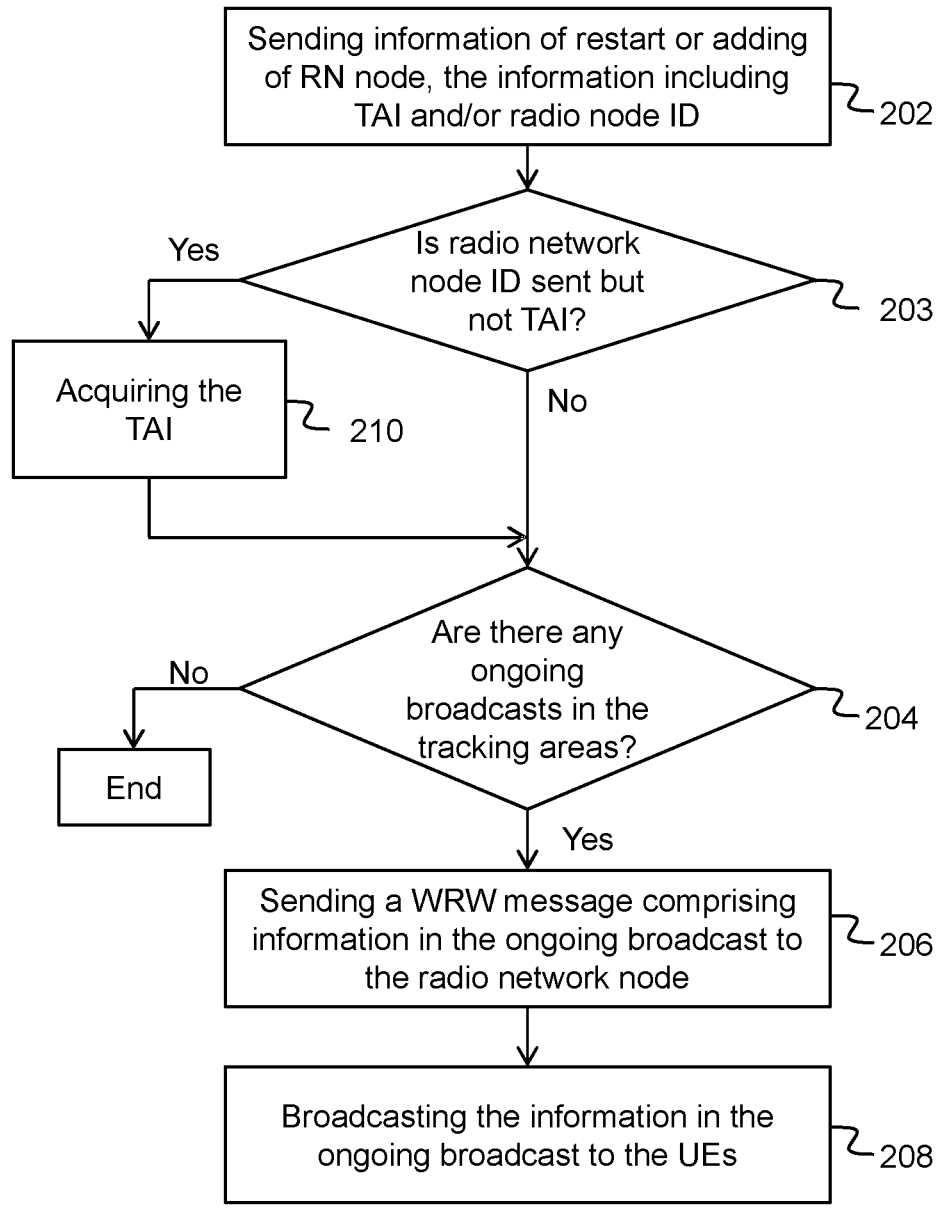
FIG. 4 is a flow chart illustrating a procedure in a communication system according to a possible embodiment.

According to an embodiment described in FIG. 4, a method is provided performed by a wireless communication network for recovering a public warning system, when a radio network node 110 comprising radio circuitry for communication with served UEs 100 has been newly added or restarted in the network. The wireless communication network comprises the radio network node and a core network node 120, 130 connected to the radio network node. The method comprises sending 202, by the radio network node to the core network node, information indicating that the radio network node has been restarted or added to the network, the information including one or more tracking area identifiers, TAI, identifying one or more tracking areas that the radio network node supports and/or a radio network node identifier, ID, identifying the radio network node in the communication network. In case the radio network node ID is sent but not the one or more TAIs 203, the method further comprises acquiring 210, by the core network node the one or more TAIs based on the received radio network node ID. The method further comprises checking 204, by the core network node based on the information sent by the radio network node, whether there are any ongoing broadcasts in any of the one or more tracking areas that the radio network node supports. When there are ongoing broadcasts in any of the one or more tracking areas that the radio network node supports, the method comprises sending 206, by the core network node, a Write Replace Warning, WRW, request message to the radio network node, the WRW request message comprising information in the ongoing broadcasts and broadcasting 208, by the radio network node to the served UEs, the information in the ongoing broadcasts, received in the WRW request message.

The radio network node may be a radio base station such as an eNodeB. The information sent by the radio network node to the core network node may be sent in a S1 setup request message. The core network node may be an MME and/or a CBC of the public warning system. According to one embodiment, the activities performed by the core network node may be divided between an MME and a CBC. The ongoing broadcasts may be warning message broadcasts. The warning message broadcasts may be distributed by the public warning system. The term "ongoing broadcasts" signifies broadcasts that are relevant to broadcast at the time when the radio network node is restarted or added to the network. The information in the ongoing broadcasts may be warning messages of approaching danger. The radio network node identifier may be a global eNodeB ID. To check whether there are any ongoing broadcasts in the tracking areas that the radio network node supports may be performed based on the one or more TAIs received from the radio network node, i.e. the core network node checks whether there is a broadcast performed in any of the tracking areas with any of the one or more TAIs and if so, sends a WRW request message to the radio network node. By such a method, persons with UEs being in a tracking area served by a certain radio network node can receive warning messages for upcoming danger from the public warning system even if the radio network node has been recently restarted or added to the network.

Figure 5:
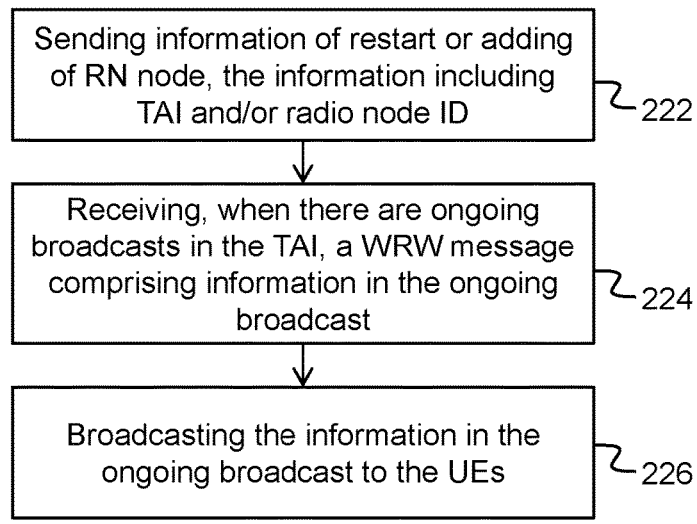
FIGS. 5-6 are flow charts illustrating procedures in communication nodes according to possible embodiments.

According to another embodiment, as described in FIG. 5, a method is described performed by a radio network node 110 of a wireless communication network for recovering a public warning system when the radio network node has been newly added or restarted in the network. The wireless communication network further comprises a core network node 120, 130 connected to the radio network node. The method comprises sending 222, to the core network node, information indicating that the radio network node has been restarted or added to the network, the information including one or more tracking area identifiers, TAI, identifying one or more tracking areas that the radio network node supports and/or a radio network node identifier, ID, identifying the radio network node in the communication network. The method further comprises, when there are ongoing broadcasts in any of the one or more tracking areas that the radio network node supports, receiving 224, from the core network node, a Write Replace Warning, WRW, request message comprising information in the ongoing broadcasts, and broadcasting 226 to UEs 100 served by the radio network node the information in the ongoing broadcasts, received in the WRW request message. The radio network node may comprise radio circuitry for communication with served user equipments, UEs.

According to an embodiment, the sent information may include the one or more TAIs but not the radio network node ID. Since in this embodiment, the core network node does not know the radio network node ID but only the one or more TAIs concerned by the added or restarted radio network node, the core network node may broadcast the WRW request message to a plurality or even all of its connected radio network nodes.

According to another embodiment, the sent information may include the radio network node ID but not the one or more TAIs.

According to another embodiment, the sent information includes the radio network node ID and the one or more TAIs.

According to another embodiment, the information sent to the core network node is sent in a S1 setup request message.

Figure 6:
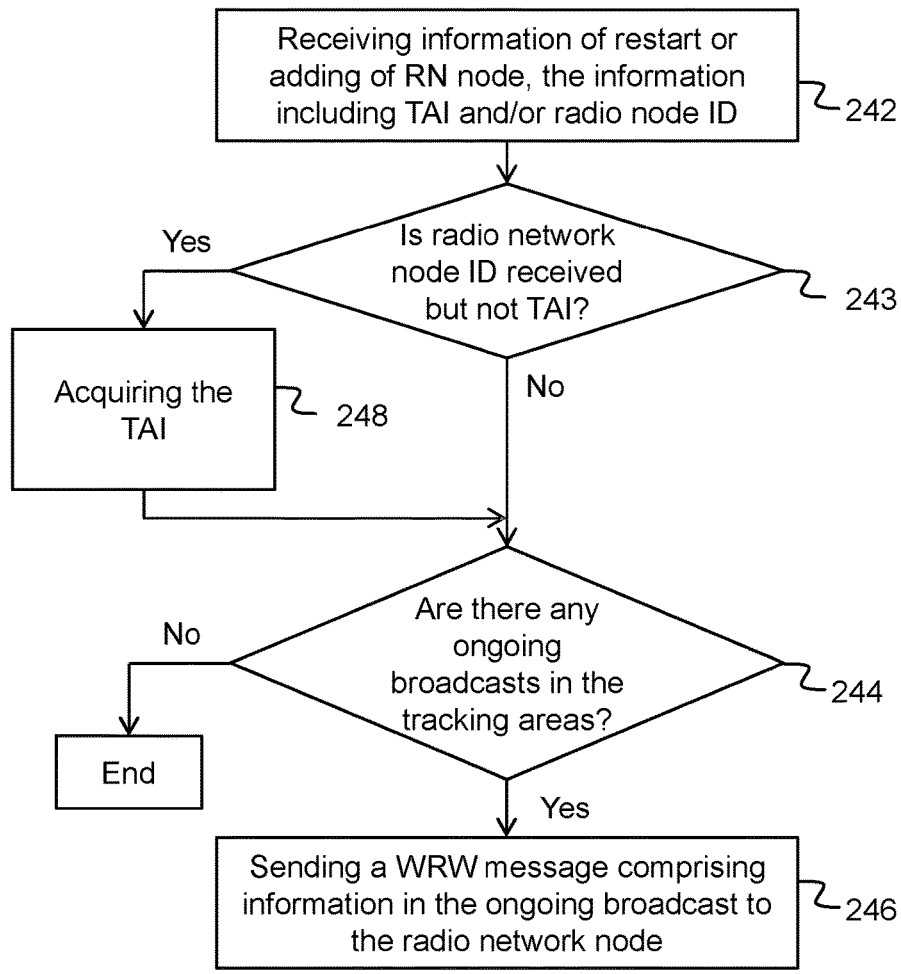

According to another embodiment shown in FIG. 6, a method is shown performed by a core network node 120, 130 of a wireless communication network for recovering a public warning system when a radio network node 110 of the wireless communication network has been newly added or restarted in the network. The radio network node is connected to the core network node 120, 130. The method comprises receiving 242, from the radio network node, information indicating that the radio network node has been restarted or added to the network, the information including one or more TAIs identifying one or more tracking areas that the radio network node supports and/or a radio network node ID identifying the radio network node in the communication network. The method further comprises, in case 243 the radio network node ID is received but not the one or more TAIs, acquiring 248 the one or more TAIs based on the received radio network node ID. The method further comprises checking 244, based on the received information, whether there are any ongoing broadcasts in the one or more tracking areas that the radio network node supports, and, when there are ongoing broadcasts in any of the one or more tracking areas that the radio network node supports, sending 246 a Write Replace Warning, WRW, request message to the radio network node, the WRW request message comprising information in the ongoing broadcasts.

The one or more TAIs may be acquired from a configured list, lookup-table or similar stored at the core network or in any other location where the information may be acquired by the core network. The list, look-up table etc. may comprise an indication of which radio network node ID that is associated with which TAIs.

According to an embodiment, the received information may include the one or more TAIs but not the radio network node ID.

According to an embodiment, the received information may include the radio network node ID but not the one or more TAIs.

According to an embodiment, the received information includes the radio network node ID and the one or more TAIs.

Figure 7:
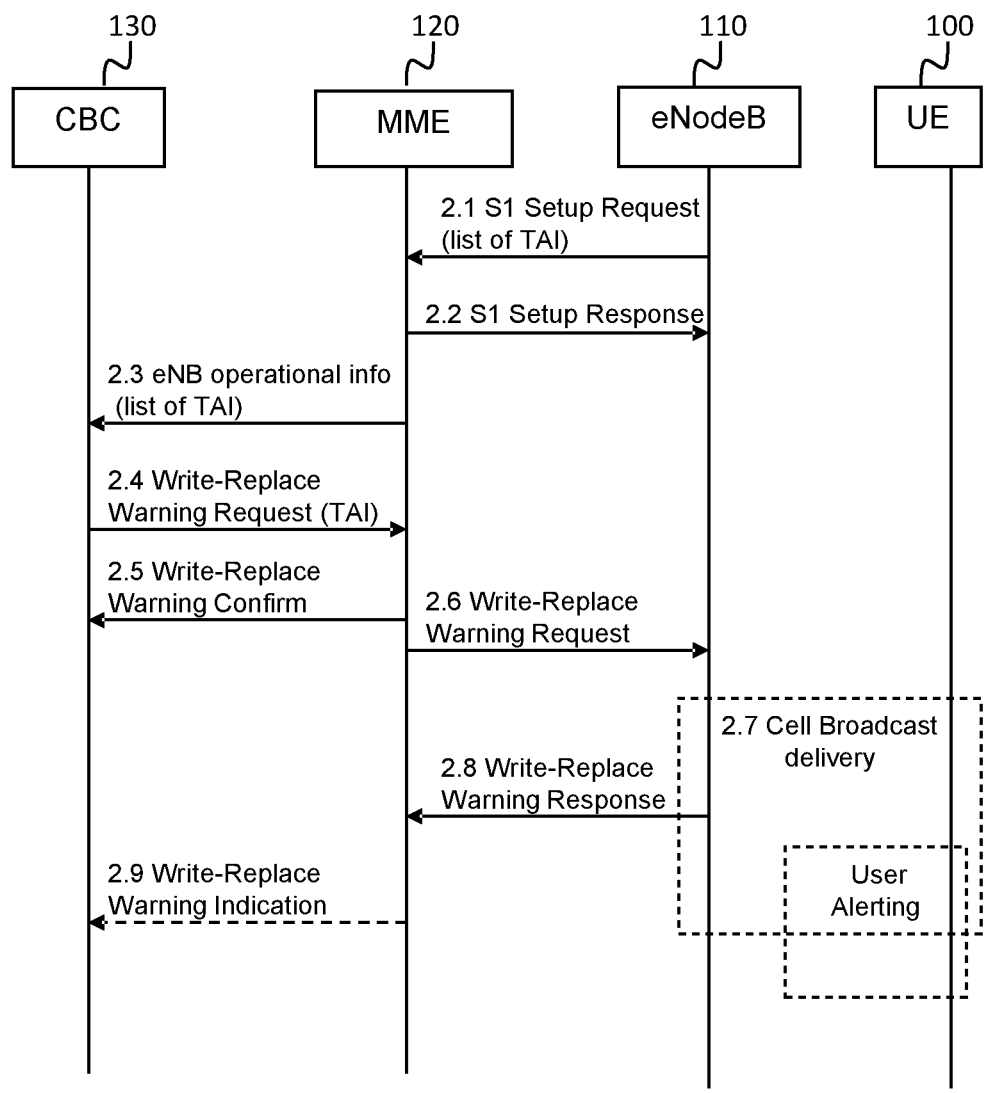
FIGS. 7-9 are signaling diagrams illustrating examples of procedures according to further possible embodiments.

FIG. 7 is a signaling diagram describing signals between nodes of a PWS and a mobile communication network according to a first embodiment. First, The MME 120 receives a S1 Setup Request message 2.1 from the eNodeB 110, the message including a list of TAIs that the eNB supports. The list of TAIs may be provided as the TAC in combination with the broadcasted PLMNs. The MME 120 responds with a S1 Setup Response message 2.2 to the eNodeB. The MME sends information that an eNodeB has become operational with information on which TAIs the newly operational eNodeB belongs to 2.3 to the CBC 130. The information that an eNodeB has become operational can be transferred to the CBC using the SBc interface between the CBC and MME. An eNodeB can belong to several TAIs. When the CBC has received the information it checks if it has started sending any warning messages in the TAIs indicated by the MME. The CBC 130 has detected that there were an ongoing warning message in one or several of the TAIs the eNodeB belongs to. The CBC then sets the appropriate target TAI for routing to the MME and includes the appropriate information in the warning area list of a Write-Replace Warning, WRW, Request message 2.4 which is sent to the MME 120. As a response to the received WRW Request message, the MME sends a Write-Replace Warning confirm message 2.5 back to the CBC. The MME then routes 2.6 the received information (in the WRW request message) from the CBC to the eNodeB 110 belonging to the indicated TAI using the WRW Request message. The eNodeB starts broadcasting 2.7 in the cells belonging to the tracking areas identified in the list of TAIs and confirms this to the MME using a Write-Replace Warning Response message 2.8. The MME may then send a Write-Replace Warning Indication message 2.9 to the CBC. The term "the TAIs that the eNodeB belongs to" may signify the tracking areas that the eNodeB belongs to identified with this TAI. In other words, in this disclosure the term TAI is sometimes used as a shortage for a tracking area having a certain tracking area identifier.

Figure 8:
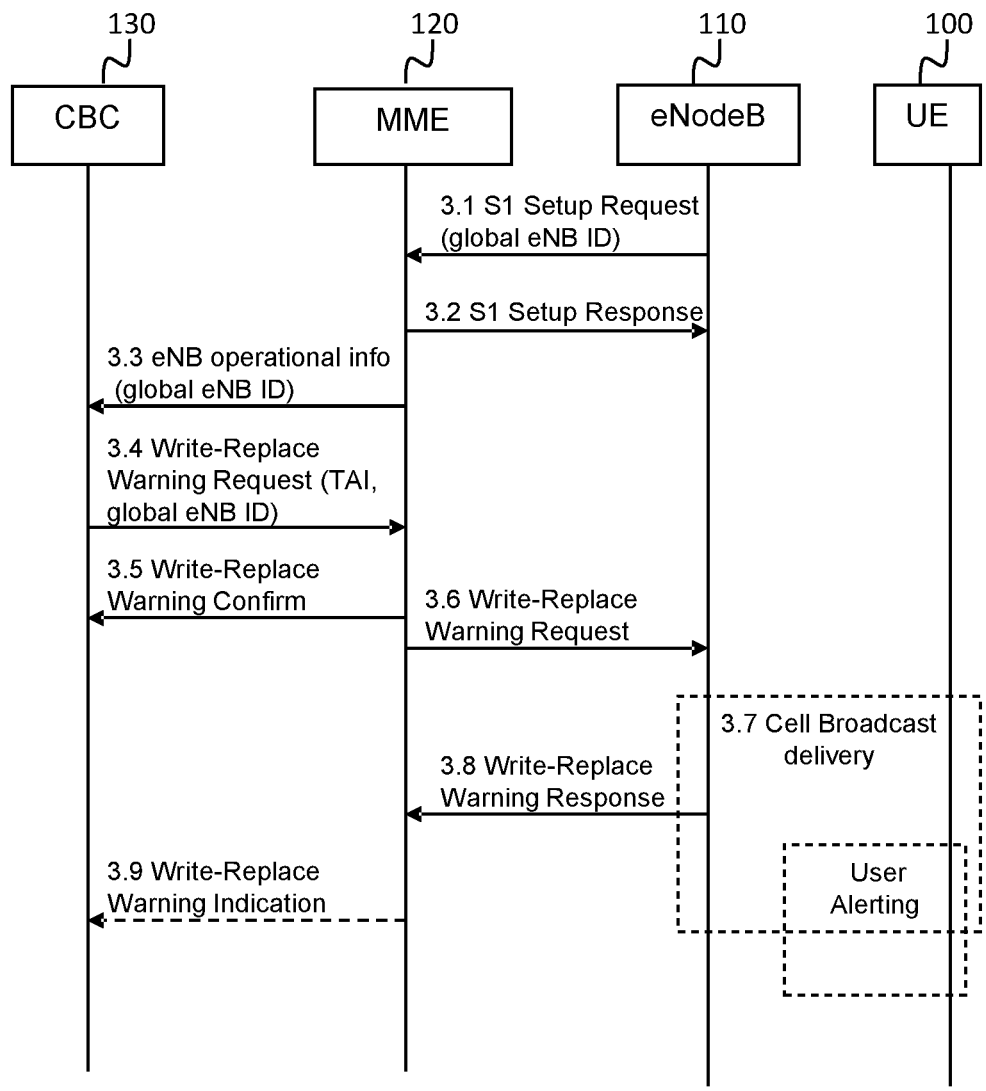

FIG. 8 is a signaling diagram describing signals between nodes of a PWS and a mobile communication network according to a second embodiment. In this embodiment the MME provides an eNodeB identifier to the CBC and not a list of TAIs. The information that an eNodeB has become operational can be transferred in a message from the MME to the CBC using the SBc interface between the CBC and the MME. The trigger of this message may be that the MME receives a S1 Setup Request message from the eNodeB which indicates that a restarted eNodeB has become operational or that a new eNodeB has been added to the network. In this embodiment it is assumed that the CBC knows, by configuration for example, which TAI or TAIs the eNodeB that has become operational belongs to, in order to select the correct TAI for routing.

In step 3.1 the MME 120 receives the S1 Setup Request message including a global eNodeB (eNB) ID uniquely identifying the eNodeB in the network. The global eNB ID may be defined in sector 8.2 of 3GPP TS 36.300, version 11.5.0. The MME responds to the S1 Setup Request message with the S1 Setup Response message 3.2 to the eNodeB. The MME sends eNodeB operational information 3.3 including the global eNB ID identifying the newly operational eNodeB to the CBC 130. When the CBC has received this information it checks if the eNodeB belongs to any TAI where there are ongoing warnings. When the CBC has detected that there were an ongoing warning in one or several of the TAIs the eNB belongs to, the CBC sets the appropriate target TAI for routing to the MME and includes the global eNB ID and the appropriate information in the warning area list, which is sent in a Write-Replace Warning Request 3.4 to the MME. When receiving the WRW Request, the MME then sends a WRW confirm message 3.5 to the CBC. The MME routes 3.6 the received information (in the Write-Replace Warning request) from the CBC to the eNodeB 110 indicated by the global eNodeB ID using the Write-Replace Warning request message. The eNodeB then starts broadcasting 3.7 in the cells belonging to the warning area list and confirms this to the MME using the Write-Replace Warning Response message 3.8. The MME may then send a Write-Replace Warning Indication message 3.9 to the CBC.

Figure 9:
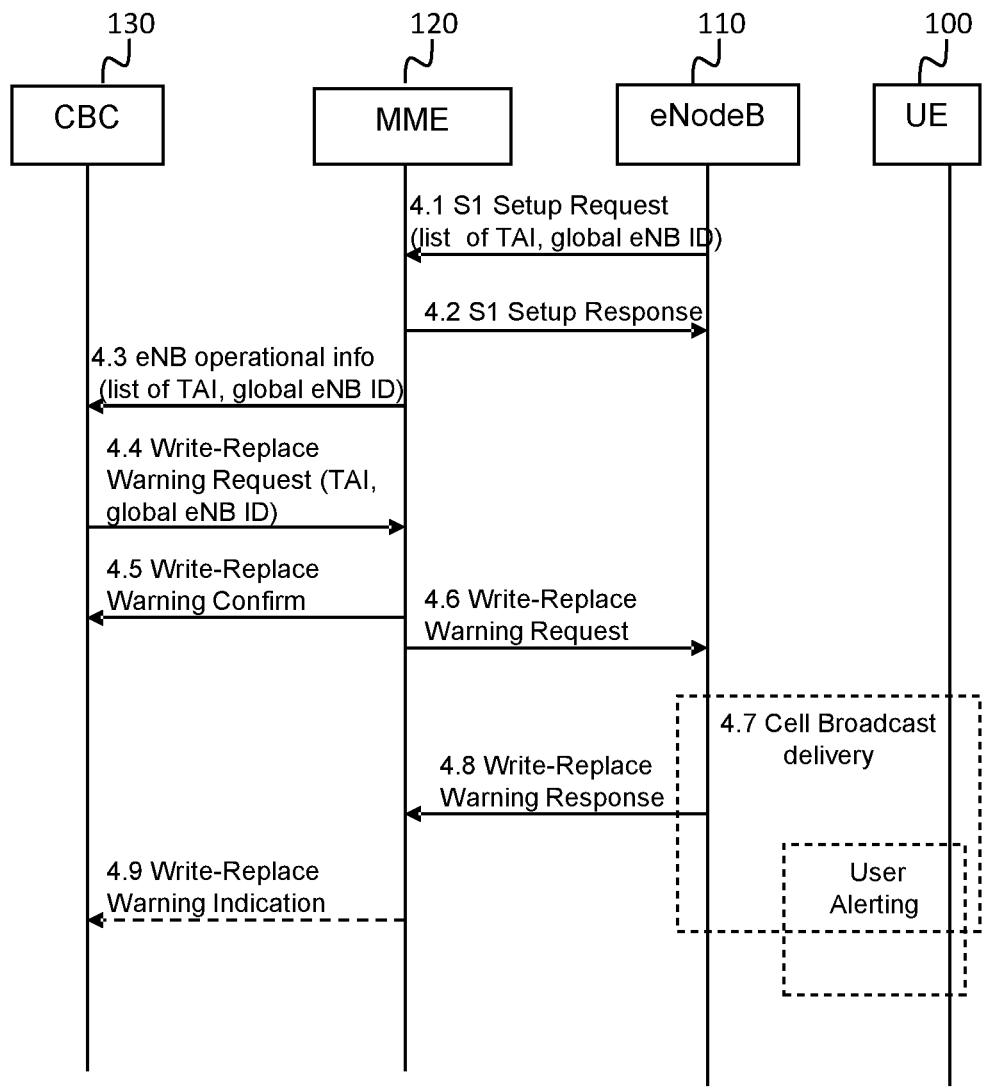

FIG. 9 is a signaling diagram describing signals between nodes of a PWS and a mobile communication network according to a third embodiment. In this embodiment the MME provides both an eNodeB identifier to the CBC and a list of TAIs. The information that an eNodeB has become operational can be transferred in a message from the MME to the CBC using the SBc interface between the CBC and the MME. The trigger of this message may be that the MME receives a S1 Setup Request message from the eNodeB which indicates that a restarted eNodeB has become operational or that a new eNodeB has been added to the network.

The MME 120 receives the S1 Setup Request message 4.1 from the eNodeB 110 including the list of TAI and the global eNB ID uniquely identifying the eNodeB in the network. The MME responds with the S1 Setup Response message 4.2 to the eNodeB. The MME sends eNB operational information 4.3 including the list of TAI and the global eNB ID identifying the newly operational eNodeB to the CBC 130. When the CBC has received the information it checks if the eNodeB belongs to any TAI where there are ongoing warnings. When the CBC has detected that there were an ongoing warning in one or several of the TAIs the eNB belongs to, the CBC sets the appropriate target TAI for routing to the MME and includes the global eNB ID and the appropriate information in the warning area list, which is sent in a Write-Replace Warning Request 4.4 to the MME. When receiving the WRW Request, the MME then sends a WRW confirm message 4.5 to the CBC. The MME routes 4.6 the received information (in the Write-Replace Warning request) from the CBC to the eNodeB 110 indicated by the global eNodeB ID using the Write-Replace Warning request message. The eNodeB then starts broadcasting 4.7 in the cells belonging to the warning area list and confirms this to the MME using the Write-Replace Warning Response message 4.8. The MME may then send a Write-Replace Warning Indication message 4.9 to the CBC.

Figure 10:
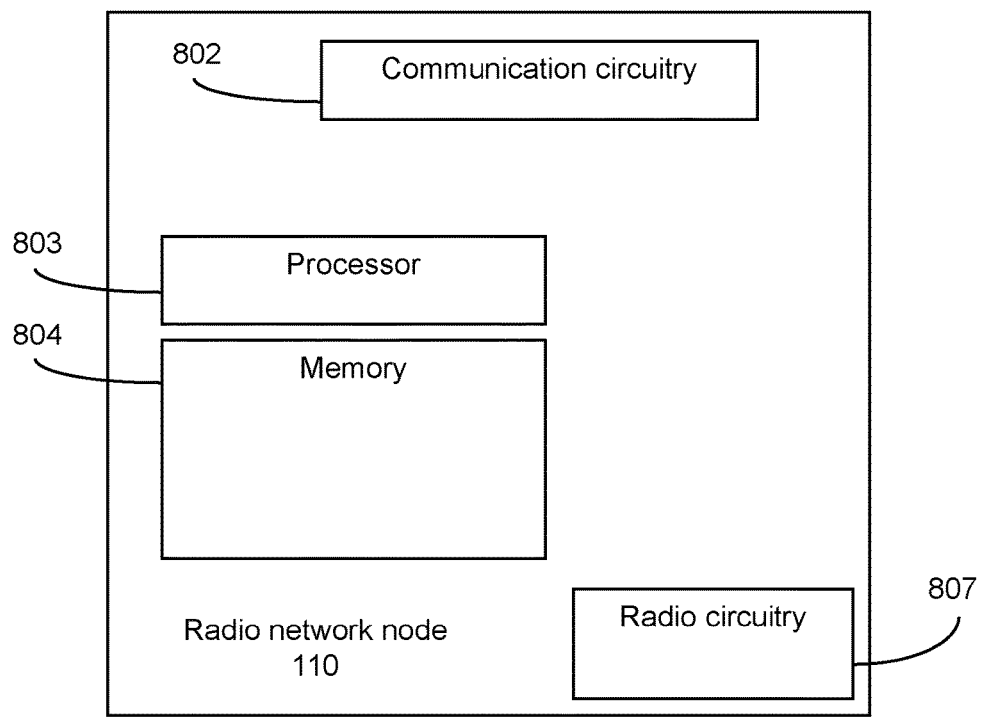
FIGS. 10-13 are schematic block diagrams illustrating nodes in more detail, according to further possible embodiments.

FIG. 10 shows a radio network node 110 according to an embodiment. The radio network node 110 is operable in a wireless communication network for recovering a public warning system when the radio network node has been newly added or restarted in the network. The wireless communication network further comprising a core network node 120, 130 connected to the radio network node. The radio network node 110 comprises a processor 803 and a memory 804. The memory 804 contains instructions executable by said processor 804, whereby said radio network node 110 is operative for sending, to the core network node, information indicating that the radio network node has been restarted or added to the network, the information including one or more TAIs identifying one or more tracking areas that the radio network node supports and/or a radio network node ID identifying the radio network node in the communication network. The memory 804 further contains instructions executable by said processor 803, whereby said radio network node 110 is operative for, when there are ongoing broadcasts in any of the one or more tracking areas that the radio network node supports, receiving, from the core network node, a Write Replace Warning, WRW, request message comprising information in the ongoing broadcasts, and broadcasting to UEs 100 served by the radio network node the information in the ongoing broadcasts, received in the WRW request message.

The radio network node 110 may further comprise communication circuitry 802 for communicating from wither other radio network and core network nodes in the communication system, such as the MME 120. The radio network node 110 may further comprise radio circuitry 807 for communicating with serving UEs as well as for broadcasting PWS information.

According to an embodiment, the information indicating that the radio network node has been restarted or added to the network includes the one or more TAIs but not the radio network node ID. According to another embodiment, the information indicating that the radio network node has been restarted or added to the network includes the radio network node ID but not the one or more TAIs. According to another embodiment, the information indicating that the radio network node has been restarted or added to the network includes the radio network node ID and the one or more TAIs. According to another embodiment, the information indicating that the radio network node has been restarted or added to the network is sent in a S1 setup request message.

The instructions executable by said processor may be arranged as a computer program stored in said memory 804. The processor 803 may comprise a processing circuitry incorporating functions of a computer central processing unit, CPU, on one or plural integrated circuits. The computer program may comprise computer readable code means, which when run in a radio network node 110 causes the radio network node to perform the steps described in the method described in relation to FIG. 5.

Figure 11:
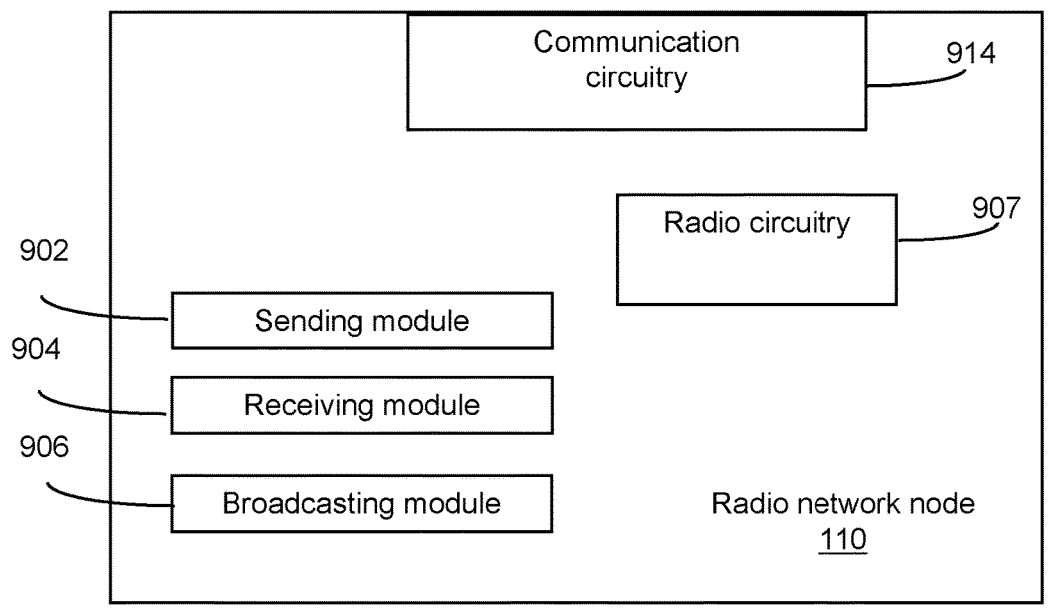

FIG. 11 shows another embodiment of a radio network node 110 that is operable in a wireless communication network for recovering a public warning system when the radio network node has been newly added or restarted in the network. The wireless communication network further comprises a core network node 120, 130 connected to the radio network node. The radio network node 110 comprises a sending module 902 for sending, to the core network node, information indicating that the radio network node has been restarted or added to the network, the information including one or more TAIs identifying one or more tracking areas that the radio network node supports and/or a radio network node ID identifying the radio network node in the communication network. The radio network node 110 further comprises a receiving module 904 for receiving from the core network node a Write Replace Warning, WRW, request message comprising information in the ongoing broadcasts, when there are ongoing broadcasts in any of the one or more tracking areas that the radio network node supports, and a broadcasting module 906 for broadcasting to UEs 100 served by the radio network node the information in the ongoing broadcasts, received in the WRW request message.

Figure 12:
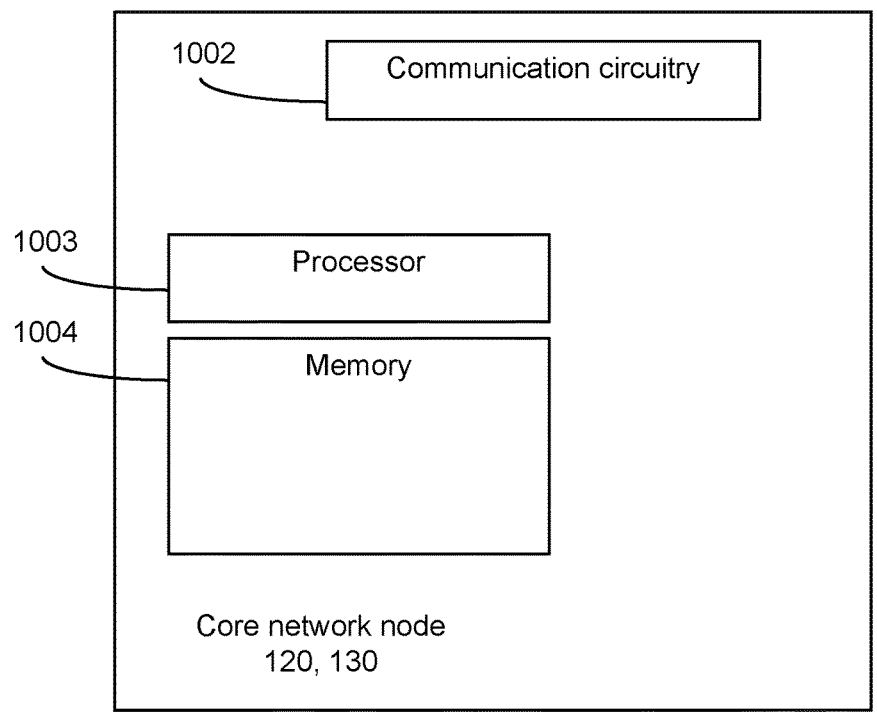

FIG. 12 shows an embodiment of a core network node 120, 130. The core network node 120, 130 is operable in a wireless communication network for recovering a public warning system when a radio network node 110 of the wireless communication network has been newly added or restarted in the network. The radio network node is connected to the core network node 120, 130. The core network node 120, 130 comprises a processor 1003 and a memory 1004. The memory contains instructions executable by said processor, whereby said core network node 120, 130 is operative for receiving, from the radio network node, information indicating that the radio network node has been restarted or added to the network, the information including one or more TAIs identifying one or more tracking areas that the radio network node supports and/or a radio network node ID identifying the radio network node in the communication network. The memory further contains instructions executable by said processor, whereby said core network node 120, 130 is operative, in case the radio network node ID is received but not the one or more TAIs, acquiring the one or more TAIs based on the received radio network node ID. The memory further contains instructions executable by said processor, whereby said core network node 120, 130 is operative for checking, based on the received information, whether there are any ongoing broadcasts in any of the one or more tracking areas that the radio network node supports, and, when there are ongoing broadcasts in any of the one or more tracking areas that the radio network node supports, sending a Write Replace Warning, WRW, request message to the radio network node, the WRW request message comprising information in the ongoing broadcasts.

The core network node 120, 130 may further comprise communication circuitry 1002 for communicating from wither other radio network and core network nodes in the communication system, such as the CBE 140 or the eNodeB 110. The core network node may be divided into an MME 120 and a CBC 130, wherein some functionalities are performed by the CBC and some functionalities are performed by the MME.

According to an embodiment, the information indicating that the radio network node has been restarted or added to the network includes the one or more TAIs but not the radio network node ID. According to another embodiment, the information indicating that the radio network node has been restarted or added to the network includes the radio network node ID but not the one or more TAIs. According to another embodiment, the information indicating that the radio network node has been restarted or added to the network includes the radio network node ID and the one or more TAIs.

The instructions executable by said processor 1003 may be arranged as a computer program stored in said memory 1004. The processor 1003 may comprise a processing circuitry incorporating functions of a computer central processing unit, CPU, on one or plural integrated circuits. The computer program may comprise computer readable code means, which when run in a core network node causes the core network node to perform the steps described in the method described in relation to FIG. 6.

Figure 13:
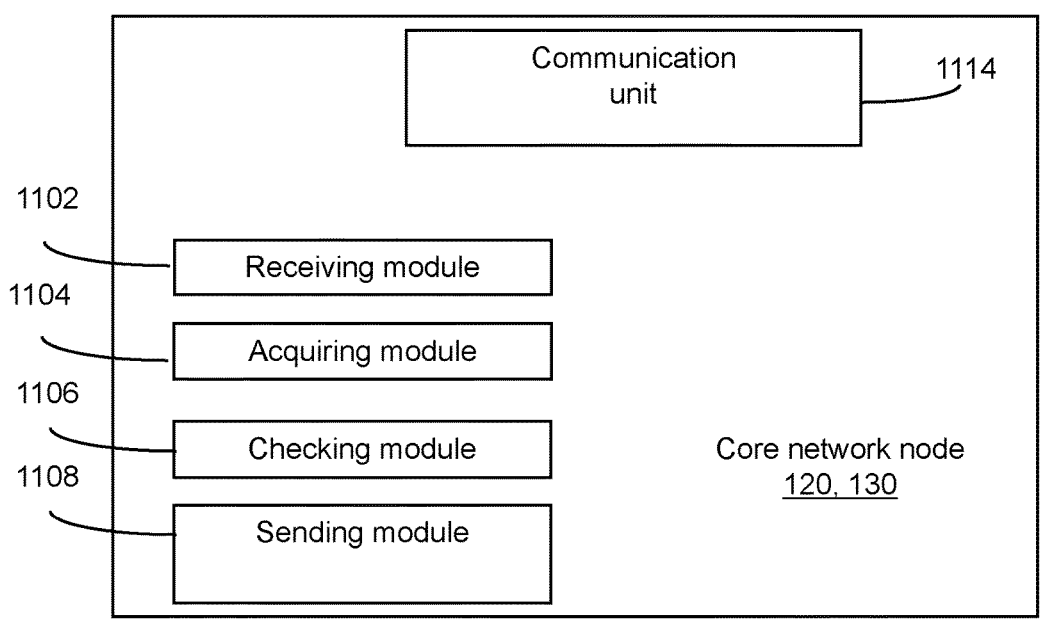

FIG. 13 describes an embodiment of a core network node 120, 130 operable in a wireless communication network for recovering a public warning system when a radio network node 110 of the wireless communication network has been newly added or restarted in the network. The radio network node is connected to the core network node 120, 130. The core network node 120, 130 comprises a receiving module 1102 for receiving, from the radio network node, information indicating that the radio network node has been restarted or added to the network, the information including one or more TAIs identifying one or more tracking areas that the radio network node supports and/or a radio network node ID identifying the radio network node in the communication network and an acquiring module 1104 for acquiring the one or more TAIs based on the received radio network node ID, in case the radio network node ID is received but not the one or more TAIs. The core network node further comprises a checking module 1106 for checking, based on the received information, whether there are any ongoing broadcasts in any of the one or more tracking areas that the radio network node supports and a sending module 1108 for sending a Write Replace Warning, WRW, request message to the radio network node when there are ongoing broadcasts in any of the one or more tracking areas that the radio network node supports, the WRW request message comprising information in the ongoing broadcasts.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a wireless communication network for recovering a public warning system when a radio network node comprising radio circuitry for communication with served user equipments, UEs, has been newly added or restarted in the network, the wireless communication network comprising the radio network node and a core network node connected to the radio network node, the method comprising:

sending, by the radio network node to the core network node, information indicating that the radio network node has been restarted or added to the network, the information including a radio network node identifier, ID, identifying the radio network node in the communication network;

obtaining, by the core network node, one or more tracking area identifiers, TAIs, identifying one or more tracking areas that the radio network node supports based on the received radio network node ID;

determining, by the core network node based on the information sent by the radio network node, whether there are any ongoing broadcasts in any of the one or more tracking areas that the radio network node supports at a time the radio network node has been restarted or added to the network;

as a result of determining that there are ongoing broadcasts in any of the one or more tracking areas that the radio network node supports at the time the radio network node has been restarted or added to the network, sending, by the core network node, a Write Replace Warning, WRW, request message to the radio network node, the WRW request message comprising information in the ongoing broadcasts; and broadcasting, by the radio network node to the served UEs, the information in the ongoing broadcasts, received in the WRW request message.

2. A method performed by a radio network node of a wireless communication network for recovering a public warning system when the radio network node has been newly added or restarted in the network, the wireless communication network further comprising a core network node connected to the radio network node, the method comprising:

sending, to the core network node, information indicating that the radio network node has been restarted or added to the network, the information including a radio network node identifier, ID, identifying the radio network node in the communication network, wherein the core network node is configured to obtain one or more tracking area identifiers, TAIs, identifying one or more tracking areas that the radio network node supports based on the received radio network node ID;

when there are ongoing broadcasts in any of the one or more tracking areas that the radio network node supports at a time the radio network node has been restarted or added to the network, receiving, from the core network node, a Write Replace Warning, WRW, request message comprising information in the ongoing broadcasts; and broadcasting to UEs served by the radio network node the information in the ongoing broadcasts, received in the WRW request message.

3. The method according to claim 1, wherein the sent information further includes the one or more TAIs.

4. The method according to claim 2, wherein the information sent to the core network node is sent in a S1 setup request message.

5. A method performed by a core network node of a wireless communication network for recovering a public warning system when a radio network node of the wireless communication network has been newly added or restarted in the network, the radio network node being connected to the core network node, the method comprising:

receiving, from the radio network node, information indicating that the radio network node has been restarted or added to the network, the information including a radio network node identifier, ID, identifying the radio network node in the communication network;

obtaining one or more tracking area identifiers, TAIs, identifying one or more tracking areas that the radio network node supports based on the received radio network node ID;

determining, based on the received information, whether there are any ongoing broadcasts in the one or more tracking areas that the radio network node supports at a time the radio network node has been restarted or added to the network; and as a result of determining that there are ongoing broadcasts in any of the one or more tracking areas that the radio network node supports at the time the radio network node has been restarted or added to the network, sending a Write Replace Warning, WRW, request message to the radio network node, the WRW request message comprising information in the ongoing broadcasts.

6. The method according to claim 5, wherein the received information further includes the one or more TAIs.

7. A radio network node operable in a wireless communication network for recovering a public warning system when the radio network node has been newly added or restarted in the network, the wireless communication network further comprising a core network node connected to the radio network node, the radio network node comprising a processor and a memory, said memory containing instructions executable by said processor, whereby said radio network node is operative for:

sending, to the core network node, information indicating that the radio network node has been restarted or added to the network, the information including a radio network node identifier, ID, identifying the radio network node in the communication network, wherein the core network node is configured to obtain one or more tracking area identifiers, TAIs, identifying one or more areas that the radio network node supports based on the received radio network node ID;

when there are ongoing broadcasts in any of the one or more tracking areas that the radio network node supports at a time the radio network node has been restarted or added to the network, receiving, from the core network node, a Write Replace Warning, WRW, request message comprising information in the ongoing broadcasts; and broadcasting to UEs served by the radio network node the information in the ongoing broadcasts, received in the WRW request message.

8. The radio network node according to claim 7, wherein the information indicating that the radio network node has been restarted or added to the network further includes the one or more TAIs.

9. The radio network node according to claim 7, wherein the information indicating that the radio network node has been restarted or added to the network is sent in a S1 setup request message.

10. A core network node operable in a wireless communication network for recovering a public warning system when a radio network node of the wireless communication network has been newly added or restarted in the network, the radio network node being connected to the core network node, the core network node comprising a processor and a memory, said memory containing instructions executable by said processor, whereby said core network node is operative for:

receiving, from the radio network node, information indicating that the radio network node has been restarted or added to the network, the information including a radio network node identifier, ID, identifying the radio network node in the communication network;

obtaining one or more tracking area identifiers, TAIs, identifying one or more tracking areas that the radio network node supports based on the received radio network node ID;

determining, based on the received information, whether there are any ongoing broadcasts in any of the one or more tracking areas that the radio network node supports at a time the radio network node has been restarted or added to the network; and as a result of determining that there are ongoing broadcasts in any of the one or more tracking areas that the radio network node supports at the time the radio network node has been restarted or added to the network, sending a Write Replace Warning, WRW, request message to the radio network node, the WRW request message comprising information in the ongoing broadcasts.

11. The core network node according to claim 10, wherein the information indicating that the radio network node has been restarted or added to the network further includes the one or more TAIs.

12. A radio network node operable in a wireless communication network for recovering a public warning system when the radio network node has been newly added or restarted in the network, the wireless communication network further comprising a core network node connected to the radio network node, the radio network node comprising:

a transceiver;
a memory; and
a processor coupled to the memory, the processor configured to:

employ the transceiver to send, to the core network node, information indicating that the radio network node has been restarted or added to the network, the information including a radio network node identifier, ID, identifying the radio network node in the communication network, wherein the core network node is configured to obtain one or more tracking area identifiers, TAIs, identifying one or more tracking areas that the radio network node supports based on the received radio network node ID;

employ the transceiver to receive, from the core network node a Write Replace Warning, WRW, request message comprising information in the ongoing broadcasts, when there are ongoing broadcasts in any of the one or more tracking areas that the radio network node supports at a time the radio network node has been restarted or added to the network; and employ the transceiver to broadcast to UEs served by the radio network node the information in the ongoing broadcasts, received in the WRW request message.

13. A core network node operable in a wireless communication network for recovering a public warning system when a radio network node of the wireless communication network has been newly added or restarted in the network, the radio network node being connected to the core network node, the core network node comprising:

a transceiver;
a memory; and
a processor coupled to the memory, the processor configured to:

employ the transceiver to receive, from the radio network node, information indicating that the radio network node has been restarted or added to the network, the information including a radio network node identifier, ID, identifying the radio network node in the communication network;

obtain one or more tracking area identifiers, TAIs, identifying one or more tracking areas that the radio network node supports based on the received radio network node ID;

determine, based on the received information, whether there are any ongoing broadcasts in any of the one or more tracking areas that the radio network node supports at a time the radio network node has been restarted or added to the network; and as a result of determining that there are ongoing broadcasts in any of the one or more tracking areas that the radio network node supports at the time the radio network node has been restarted or added to the network, employing the transceiver to send a Write Replace Warning, WRW, request message to the radio network node, the WRW request message comprising information in the ongoing broadcasts.

14. A computer program product comprising a non-transitory computer readable medium storing computer readable code, which when run in a radio network node operable in a wireless communication network for recovering a public warning system when the radio network node has been newly added or restarted in the network, causes the radio network node to perform the following steps:

sending, to a core network node, information indicating that the radio network node has been restarted or added to the network, the information including a radio network node identifier, ID, identifying the radio network node in the communication network, wherein the core network node is configured to obtain one or more tracking area identifiers, TAIs, identifying one or more tracking areas that the radio network node supports based on the received radio network node ID;

when there are ongoing broadcasts in any of the one or more tracking areas that the radio network node supports at a time the radio network node has been restarted or added to the network, receiving, from the core network node, a Write Replace Warning, WRW, request message comprising information in the ongoing broadcasts; and broadcasting to UEs served by the radio network node the information in the ongoing broadcasts, received in the WRW request message.

15. A computer program product comprising a non-transitory computer readable medium storing computer readable code means, which when run in a core network node operable in a wireless communication network for recovering a public warning system when a radio network node of the wireless communication network has been newly added or restarted in the network, causes the core network node to perform the following steps:

receiving, from the radio network node, information indicating that the radio network node has been restarted or added to the network, the information including a radio network node identifier, ID, identifying the radio network node in the communication network;

obtaining one or more tracking area identifiers, TAIs, identifying one or more tracking areas that the radio network node supports based on the received radio network node ID;

determining, based on the received information, whether there are any ongoing broadcasts in any of the one or more tracking areas that the radio network node supports at a time the radio network node has been restarted or added to the network; and as a result of determining that there are ongoing broadcasts in any of the one or more tracking areas that the radio network node supports at the time the radio network node has been restarted or added to the network, sending a Write Replace Warning, WRW, request message to the radio network node, the WRW request message comprising information in the ongoing broadcasts.

* * * * *